(12) United States Patent
Zhao et al.

(10) Patent No.: US 10,548,090 B2
(45) Date of Patent: Jan. 28, 2020

(54) METHOD AND BASE STATION FOR DETERMINING AN UPLINK POWER CONTROL TARGET

(71) Applicant: Telefonaktiebolaget LM Ericsson (publ), Stockholm (SE)

(72) Inventors: Yufeng Zhao, Upplands Väsby (SE); Ying Sun, Sundbyberg (SE); Torbjörn Wigren, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/772,167

(22) PCT Filed: Nov. 10, 2015

(86) PCT No.: PCT/EP2015/076175
§ 371 (c)(1),
(2) Date: Apr. 30, 2018

(87) PCT Pub. No.: WO2017/080587
PCT Pub. Date: May 18, 2017

(65) Prior Publication Data
US 2018/0359708 A1    Dec. 13, 2018

(51) Int. Cl.
*H04W 52/14*   (2009.01)
*H04B 17/345*   (2015.01)
(Continued)

(52) U.S. Cl.
CPC ........ *H04W 52/146* (2013.01); *H04B 17/345* (2015.01); *H04W 52/243* (2013.01); *H04W 88/08* (2013.01)

(58) Field of Classification Search
None
See application file for complete search history.

(56) References Cited

U.S. PATENT DOCUMENTS

| 8,046,019 B2 * | 10/2011 | Hosein | H04W 52/146 |
| | | | 455/522 |
| 8,121,631 B2 * | 2/2012 | Goia | H04B 17/309 |
| | | | 455/522 |

(Continued)

FOREIGN PATENT DOCUMENTS

| WO | 2009116905 A1 | 9/2009 |
| WO | 2015127021 A1 | 8/2015 |

OTHER PUBLICATIONS

Wigren, T. et al., "Recursive Noise Floor Estimation in WCDMA", IEEE Transactions on Vehicular Technology, vol. 59, No. 5, Jun. 1, 2010, pp. 2615-2620, IEEE.

(Continued)

*Primary Examiner* — Fayyaz Alam
(74) *Attorney, Agent, or Firm* — Patent Portfolio Builders, PLLC

(57) ABSTRACT

It is disclosed a base station of a cell having at least a first and a second antenna sector, where the base station is distributed in terms of location and a method performed in said base station for determining an uplink power control target for a UE that is connected to the first antenna sector. The method comprises estimating (42, 504), in the at least the first and the second antenna sectors, a thermal noise floor; and determining (44, 516) the uplink power control target based on a maximum of the estimated thermal noise floors in all of the at least the first and the second antenna sectors. The method improves uplink performance of cells with antenna sectors having different receiver sensitivity, and provides enhanced observability of UEs for cells extending over multiple base stations.

19 Claims, 5 Drawing Sheets

(51) Int. Cl.
*H04W 52/24* (2009.01)
*H04W 88/08* (2009.01)

(56) References Cited

U.S. PATENT DOCUMENTS

| | | | | |
|---|---|---|---|---|
| 2010/0167771 | A1* | 7/2010 | Raghothaman | H04W 52/244 |
| | | | | 455/501 |
| 2012/0327804 | A1* | 12/2012 | Park | H04W 52/146 |
| | | | | 370/252 |
| 2013/0095870 | A1* | 4/2013 | Phillips | H04W 52/146 |
| | | | | 455/501 |
| 2015/0288414 | A1* | 10/2015 | Morrison | H04B 1/525 |
| | | | | 455/78 |

OTHER PUBLICATIONS

Wigren, T. et al., "Soft Uplink Load Estimation in WCDMA", IEEE Transactions on Vehicular Technology, vol. 58, No. 2, Feb. 1, 2009, pp. 760-772, IEEE.

Wigren, T. et al., "Estimation of uplink WCDMA load in a single RBS", Conference paper, IEEE 66th Vehicular Technology Conference, Sep. 30, 2007, pp. 1-5, IEEE.

3rd Generation Partnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.8.0, Sep. 1, 2014, pp. 1-182, 3GPP, France.

\* cited by examiner

METHOD AND BASE STATION FOR DETERMINING AN UPLINK POWER CONTROL TARGET

TECHNICAL FIELD

This disclosure relates to uplink power control. More particularly, it relates to a base station and a method for determining an uplink power control target.

BACKGROUND

With increased number of small cell products and deployment thereof, the characteristics of radio products are likely to vary increasingly. Different radio products can have different receiver sensitivities.

It is envisaged that in the future 5G wireless communication systems will require multi-point transmissions using for instance distributed antenna systems (DAS). Increases in carrier frequency also cause increases in radio shadowing.

In DAS, antennas corresponding to a cell or a sector are no longer co-located, but are distributed in terms of locations.

FIG. 1 schematically presents a distributed base station 102 having a central power control 104 of a cell having distributed antenna sector i 106, antenna sector j 108 and antenna sector N 110.

The reason for using DAS may typically be a need to better cover a geographical region, which cannot be covered from a single location, and where it is desired to keep the connectivity to one specific sector/cell. More detailed reasons are however beyond the scope of the present application.

One example of a combined cell is to combine a radio dot system (RDS) with a DAS or an outdoor macro antenna sector. The RDS may have more than 20 dB higher noise floor level compared to macro products. Different indoor RDS cells may also have different noise floors levels depending on the length of the cable between the radio head in the sector and the corresponding radio unit, and the number of radio heads (or DOTs) in a cell.

A combined cell is a logical cell to which multiple antenna sectors belong. Antenna sectors belonging to a combined cell may either be located indoors or outdoors. The logical cell represented by the antenna sectors therein has the same Physical Cell Identity (PCI). The same cell level settings are hence used for all antenna sectors of the combined cell.

Combined cells may be used to combine macro sectors and small sectors, combine two or more indoor sectors, and/or to combine indoor and outdoor sectors, for instance.

Using a combined cell may reduce interference, improve radio condition and eliminate handovers between antenna sectors which else would have belonged to different cells.

When a combined cell has antenna sectors with different types of radio products, for example macro radio with micro radio or indoor radio, the receiver sensitivity of different antenna sectors may vary significantly.

A base station, for instance, an eNB, is capable to measure the power in a spectral band of UEs performing UL transmissions. The eNB can thus be considered to measure the sum of all powers received from UEs. These powers obey (1)

$$P\_total(t)=P\_neighbor\ cells(t)+P\_serving\ cell(t)+P\_N(t), \quad (1)$$

where P_total (t) is the total power of the spectral band that is measured by the eNB, P_neighbor cells (t) is the sum of interfering power from UEs located in neighbor cells, P_serving cell (t) is the sum of the power from UEs located in the serving cell, and P_N (t) is the thermal noise floor power of the serving cell.

Equation (1) can be rewritten as equation (2)

$$P\_neighbor\ cells(t)+P\_N(t)=P\_total(t)-P\_serving\ cell(t) \quad (2)$$

A base station measuring uplink signals, may thus subtract the power of UEs in the serving cell from the total power detected. However, the base station will not be able to distinguish the power contribution from UEs in neighboring cells from the power of the thermal noise floor, using equation (2).

The level of noise floors may however be estimated by applying an estimation of a soft minimum of a total received power, as calculated over a relative long time window.

Now, for a cell having multiple antenna sectors, the uplink power control target (P0) needs to be set to a value such that the UE can achieve a good uplink performance, i.e. a sufficient signal to noise ratio, typically above a certain threshold value, no matter which antenna sector the UE is connected to, and without introducing high interference.

By setting the P0 according to sector that has the highest noise floor causes the UE to output unnecessarily high power when it is connected to the sector that has a low (i.e. lower) noise floor, and thereby introduces interference to the neighbor cells. Also, outputting an unnecessarily high power will shorten the battery lifetime of the UE.

By setting the P0 according to the sector that has the lowest noise floor, may have the consequence that the UE is not able to get access to an antenna sector that has higher noise floor, due to that the power received in that antenna sector cannot overcome said higher noise floor. Also, sector selection based on received signal power will not be possible.

Moreover, by considering both antenna sectors that have relatively higher and lower noise floor levels, respectively, and setting the P0 to a value in between, has the drawback that it is difficult to tune and to find an optimal value. Also, the UE will experience a performance drop in the antenna sector with the higher noise floor, and create unnecessary high interference in the antenna sector with the lower noise floor.

There is therefore a need for determining an uplink power control target (P0) addressing the issues discussed above.

SUMMARY

It is an object of exemplary embodiments herein to address at least some of the issues outlined above and to determine an uplink power control target (P0) for a UE connected to an antenna sector. This object and others are achieved by a base station, and a method performed therein, according to the appended independent claims, and by the exemplary embodiments according to the dependent claims.

According to an aspect, the exemplary embodiments provide a method performed in a base station of a cell having at least a first and a second antenna sector, where the base station is distributed in terms of location. The method comprises estimating in the at least the first and the second antenna sectors, a thermal noise floor. The method also comprises determining an uplink power control target, for a user equipment connected to the first antenna sector, based on a maximum of the estimated thermal noise floors in all of the at least the first and the second antenna sectors.

According to another aspect, the exemplary embodiments provide a base station of a cell having at least a first and a second antenna sector, where the base station is configured to be distributed in terms of location. The base station is configured to estimate, in the at least the first and the second antenna sectors, a thermal noise floor. The base station is also configured to determine an uplink power control target, for a user equipment connected to the first antenna sector, based on a maximum of the estimated thermal noise floors in all of the at least the first and the second antenna sectors.

According to another aspect, the exemplary embodiments provide a base station of a cell that has at least a first and a second antenna sector, where the base station is configured to be distributed in terms of location. The base station comprises a processing circuit and a memory, where said memory contains instructions executable by said processing circuit whereby said base station is operative to estimate, in the at least the first and the second antenna sectors, a thermal noise floor. The base station is further operative to determine an uplink power control target, for a user equipment connected to the first antenna sector, based on a maximum of the estimated thermal noise floors in all of the at least the first and the second antenna sectors.

According to further aspects, the object is also achieved by a computer program and a computer program product comprising a computer-readable storage medium corresponding to the aspects above.

Exemplary embodiments of this disclosure present the following advantages:

An improved uplink performance of cells with antenna sectors having different receiver sensitivity is provided.

Consequently, an elimination of the P0 configuration problem for cells with antenna sectors having different receiver sensitivity.

Also, an enhanced observability of UEs for cells extending over multiple base stations is provided.

Other objects, advantages and features of embodiments will be explained in the following detailed description when considered in conjunction with the accompanying drawings and claims.

BRIEF DESCRIPTION OF THE DRAWINGS

Embodiments will now be described in more detail, and with reference to the accompanying drawings, in which.

DETAILED DESCRIPTION

Figure 1:
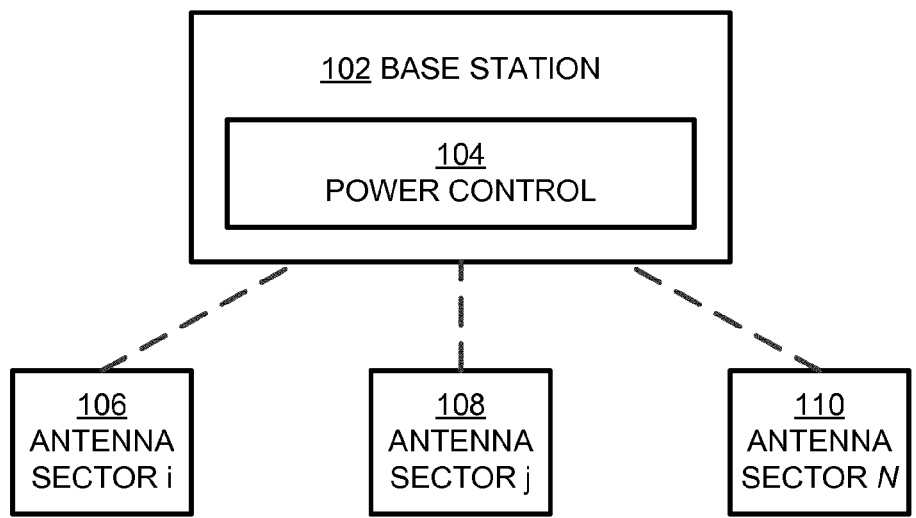
FIG. 1 schematically illustrates a base station of a cell having multiple antenna sectors.

In the following description, exemplary embodiments will be described in more detail, with reference to accompanying drawings. For the purpose of explanation and not limitation, specific details are set forth, such as particular examples and techniques in order to provide a thorough understanding.

The present disclosure relates to the determination of an uplink power control target for a UE based on an antenna sector that the UE is connected to, within a cell, such as a combined cell/DAS, which has antenna sectors with different noise floor levels.

Uplink power control target is determined for a UE in a cell that is configured with various types of radio receivers in different sectors within the cell.

The determination of uplink power control target may be started by determination of an initial uplink power control target P0 on a cell level, based on the maximum of estimated noise floor levels of all sectors of the cell. This determination is performed at cell setup according to some embodiments.

The P0 may then be updated with a UE specific P0 target which may be calculated based on the antenna sector(s) to which the UE is connected, detection sensitivity in terms of the thermal noise floor of each antenna sector and a predefined combining power component (A). The updated UE specific P0 may then be signaled from a base station of the serving cell to the UE using RRC configuration. The UE shall for this reason be in RRC connected mode.

As an alternative to RRC signaling of the updated UE specific P0 to the UE, when RRC signaling is costly, the setting of the uplink power control target may be implemented as an internal base station uplink power control target per antenna sector. A closed loop uplink power control may be used to enforce the received power from the UE to reach the internal uplink power control target.

The determination of an uplink power control target for a UE may be based on the estimated thermal noise floor of the antenna sector that is connected to the UE. For the determination of the uplink power control target P0, it is useful to start from a cell level power level, which power level therefore is the same for all antenna sectors of the cell. This P0 level is called the nominal level of P0, or simply P0_nominal, for the cell. This P0_nominal level is set such that an uplink signal having a power equal to the P0_nominal is sufficiently strong to be received by all antenna sectors in the cell, including the antenna sector having the highest thermal noise floor.

The higher the thermal noise floor level in an antenna sector, the stronger the signal has to be for a given uplink performance, or signal to noise ratio.

To achieve a certain signal to noise ratio in the antenna sector having the highest thermal noise floor, N_max, a signal-to-noise ratio, offset_cell, in decibel (dB), is introduced.

$$P0\_nominal = N\_max + offset\_cell \qquad (3)$$

The P0_nominal, or P0_nom, can be calculated using equation (3), where offset_cell may be predefined or estimated.

It should be pointed out that the N_max in equation (3), is a theoretically estimate of the highest thermal noise floor level.

The thermal noise floor of each antenna sector of the cell is then estimated.

It is noted that in the prior art, the radio unit by which an estimate of the noise floor, can be measured, is located in the central radio unit of the base station.

In contrast, it is herein proposed that as antenna distribution evolves, parts of the radio unit of the base station may well be distributed. It is therefore conceivable that the estimation of thermal noise floor is distributed as well.

Figure 2:
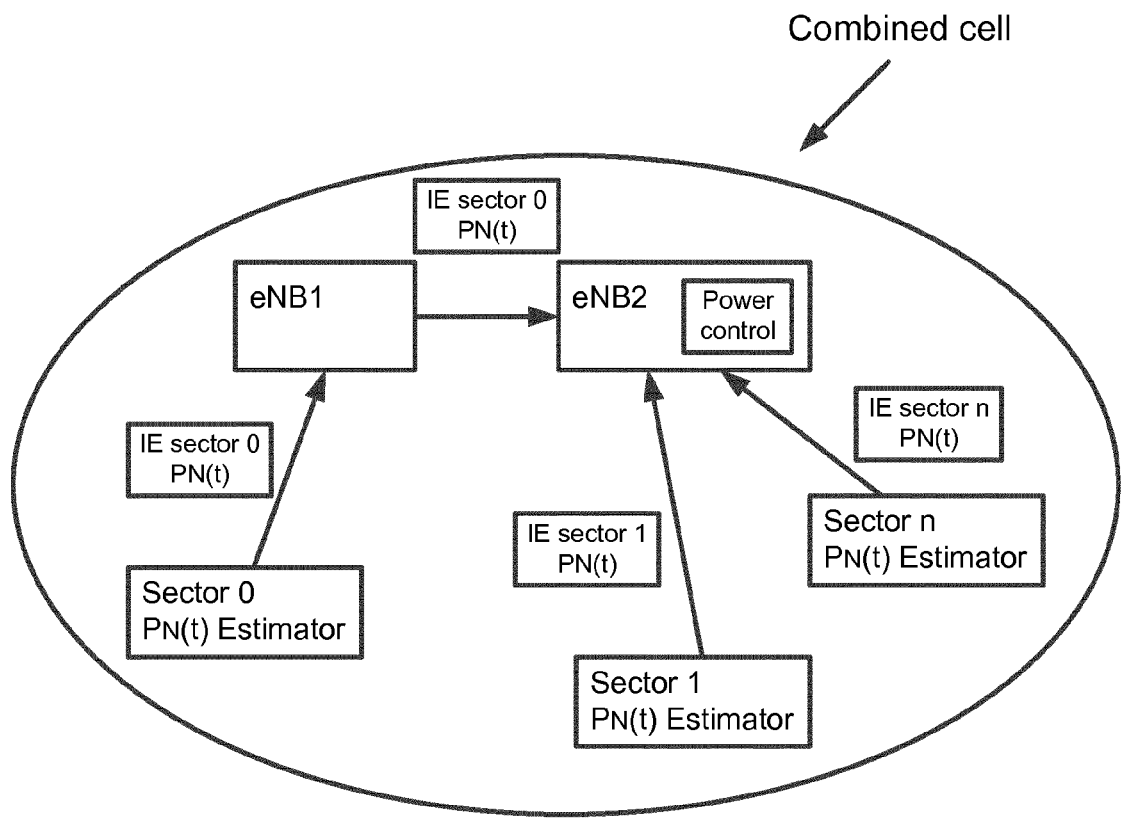
FIG. 2 illustrates an example of a distributed base station of a cell having distributed antenna sectors according to some embodiments of the present disclosure.

FIG. 2 illustrates an example of a distributed base station of a cell having distributed antenna sectors according to some embodiments of the present disclosure. It is illustrated to estimate the thermal noise floor locally at each broken out antenna radio unit of each antenna sector and to signal information about thermal noise power levels, P_N (t) to a power control function of the cell of base station, eNB2. From FIG. 2 it is illustrated that antenna sector 0 is served by eNB1, whereas antenna sectors 1 and n, are served by eNB2. The radio unit of antenna sector 0 signals an estimate of the thermal noise floor level of antenna sector 0 via the eNB1 to the eNB2. For the antenna sectors which are served by the eNB2, for example 1, . . . , n, the radio unit of each such antenna sector may signal an estimate of its thermal noise floor level to the power control of the eNB1. Signaling may be performed using an information element (IE) comprising an antenna sector identifier and a data item representing the estimated thermal noise floor value of the antenna sector. Signaling of the estimated thermal noise floor of antenna sector 0 between the eNB1 and eNB2, may be performed by using the X2 interface.

Signaling is hence performed to enable the distribution of the determination of the uplink power control target of the cell.

It is noted that the estimation of the thermal noise floor may be performed for any selected set of sub bands of the total uplink spectral band.

Having determined an estimation of the estimated thermal noise floor value in each antenna sector, the highest thermal noise floor value of these estimates may thus be determined. The P0-nominal may then be updated based on the determined highest thermal noise floor value.

The uplink power control target of a UE depends on the antenna sector to which the UE is connected, when being in RRC connected mode.

As described previously, the uplink power control target is advantageously determined such that uplink signals from the UE can be detected even in the antenna sector having the highest thermal noise floor value, but also such that the uplink signal will not create unnecessary high interference in a sector having a low, or lower, noise floor.

If the UE in question is connected to an antenna sector having the highest thermal noise floor, the uplink power control target P0 is equal to the P0_nominal.

As determined above from equation (3), the P0 equals to the N_max plus an offset_cell being a signal-to-noise value.

However, if the antenna sector to which the UE is connected is not the antenna sector with the highest thermal noise floor, setting the uplink power control target to the P0_nominal will create unnecessary high interference.

The uplink power control target cannot either be set according to the noise floor of the antenna sector only, because this may result in that the uplink cannot be detected in the antenna sector having the highest noise floor. Therefore, it is herein proposed to set the uplink power control target such that the uplink power control target comprises a power component equal to an offset power on the cell level, the so called offset-cell, which assures a signal-to-noise of the power of the uplink signal detectable in each antenna sector.

The uplink signal from the UE shall preferably also be detectable by other antenna sectors enabling a joint reception of the uplink signal. For this reason, the uplink power control shall also take into account a combining power component threshold, $\Delta$. This combining power component threshold can be defined as the maximum detectable power difference between the power of uplink signals received in two antenna sectors, with which a joint reception and combining of the two received signals results in a reception gain.

The determination of the uplink power control target P0 in antenna sector i, thus is P0_i, may be defined according to equation (4).

$$P0\_i=\max(N\_i+\text{offset\_cell}, N\_\max+SNR\_\min+\Delta), \quad (4)$$

wherein Ni is the thermal noise floor level of antenna sector i, SNR_min is the minimal signal-to-noise ratio in dB for a signal to be detectable in the antenna sector having the highest thermal noise floor. The highest thermal noise floor level plus the minimal signal-to-noise ratio for a signal to be detectable in the antenna sector having the highest thermal noise floor, i.e. N_max+SNR_min, equals to the minimal detectable signal level for the antenna sector that has the highest noise floor.

The P0_i is thus the maximum of (N_i+offset_cell) and (N_max+SNR_min+$\Delta$). Down below, two examples are schematically described for which the maximum of the equation (4) differ.

Figure 3A:
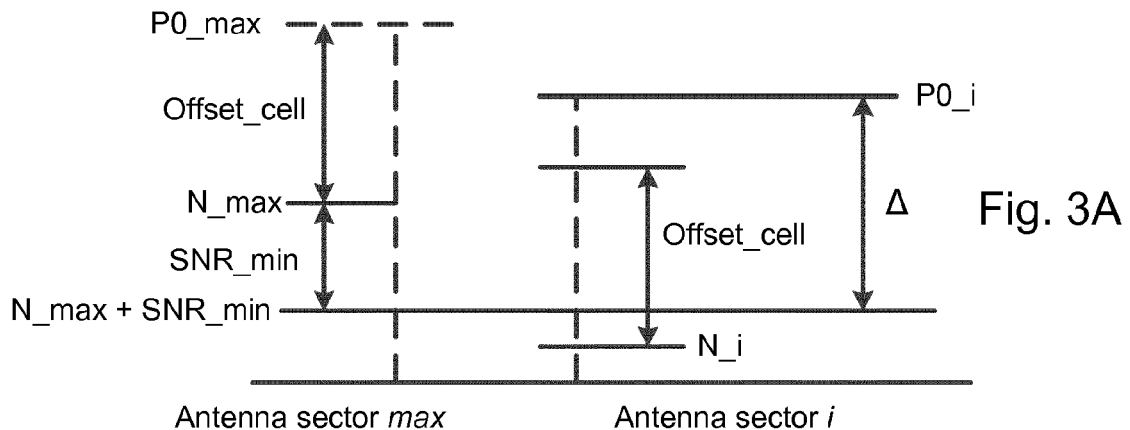
FIGS. 3A and 3C visualize determination of uplink power control targets in different antenna sectors of a cell.

FIG. 3A schematically visualizes a first example where power levels of an uplink signal as detected at locations where joint reception of a received signal results in a reception gain. At these locations, it is found that:

$$P0\_i=N\_\max+SNR\_\min+\Delta>N\_i+\text{offset\_cell} \quad (5)$$

Thus at these locations the uplink power control target P0_i is determined to be higher than N_i+offset_cell, but also lower than N_max+offset_cell. An intermediate power level is hereby determined at which an uplink signal may be detected in antenna sector having the highest thermal noise floor, i.e. N_max, while not causing too high an interference in neighboring cells.

Figure 3B:
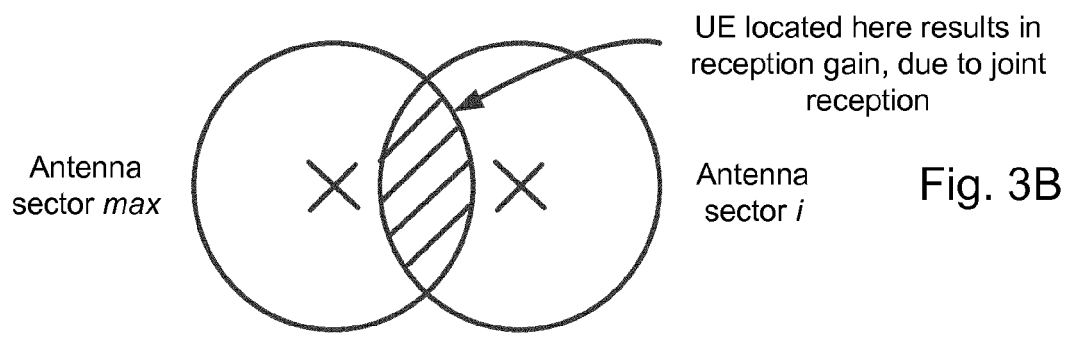
FIGS. 3B and 3D visualize typical location areas of a UE sending an uplink signal, corresponding to uplink power control targets of FIGS. 3A and 3C, respectively.

FIG. 3B schematically visualizes an example of a location area of a UE being connected to antenna sector i and sending an uplink signal, in which location area, joint reception of the uplink signal in antenna sector i and antenna sector in which the noise floor is the highest, results in a reception gain. This location area corresponds to the power levels as schematically visualized in FIG. 3A.

Figure 3C:
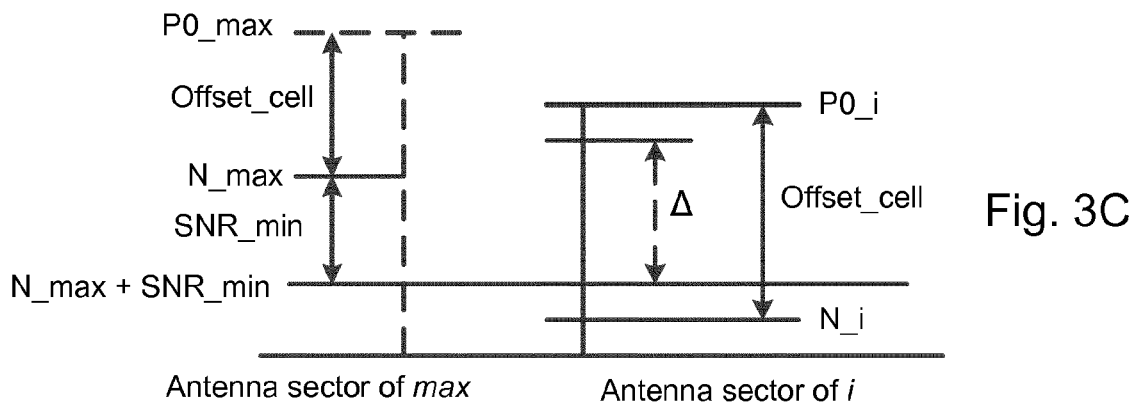

FIG. 3C schematically visualizes a second example where power levels of an uplink signal as detected at locations where the uplink signal may be received in the antenna sector i and in the antenna sector having the highest thermal noise floor. When the UE is connected to the antenna sector having the highest thermal noise floor, the uplink power control target is P0_max.

As described above, the uplink power control target P0_i may be determined from equation (4). When the UE is connected to antenna sector i, the uplink power control target P0_i fulfills equation (6):

$$P0\_i=N\_i+\text{offset\_cell}>N\_\max+SNR\_\min+\Delta, \quad (6)$$

In the first example, as described above, the determined P0_i comprises a combining gain component that is equal the combining gain threshold.

In this second example, the P0_i is even higher than N_max+SNR_min+$\Delta$, which means that the P0_i comprises a combining gain component that is higher than the combing gain threshold $\Delta$.

Figure 3D:
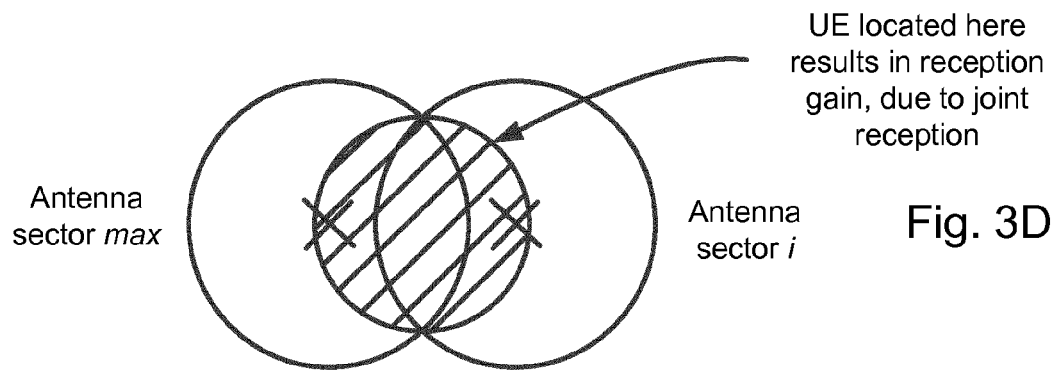

FIG. 3D schematically visualizes an example of a location area, corresponding to the power levels of an uplink signal of FIG. 3C, where the uplink signal may be received in the antenna sector i and in the antenna sector having the highest thermal noise floor. Joint reception may here thus result in an even higher reception gain than the reception gain of the first example.

The uplink power control target that has been determined is thus an uplink power control target for a UE that is connected to an antenna sector. In the case the antenna sector, to which the UE is connected, has the highest thermal noise floor within the cell, the P0_i equals to the nominal cell value, P0_nom.

The relation between the UE-specific P0, i.e. P0_UE, the P0 for antenna sector i, i.e. P0_i, and the nominal P0, i.e. P0_nom, is shown in equation (7).

$$P0\_UE = P0\_i - P0\_nom \quad (7)$$

For the antenna sector having the highest thermal noise floor value P0_i=P0_max. P0_UE hence equals to P0_max−P0_nom. As P0_max is P0_nom, P0_UE is 0 for the antenna sector having the highest thermal noise floor.

In the case the antenna sector in which the UE is located, does not have the highest thermal noise floor in the cell, the P0_i is not equal to the P0_nom, for which reason there is a non-zero P0_UE.

As mentioned above, a determined uplink power control target may either be signaled to the UE using RRC signaling, or when RRC signaling is costly, implemented as a base station internal uplink power control target. A closed loop uplink power control may be used to enforce the power of an uplink signal received from the UE until it reaches the internal P0 target.

Figure 4:
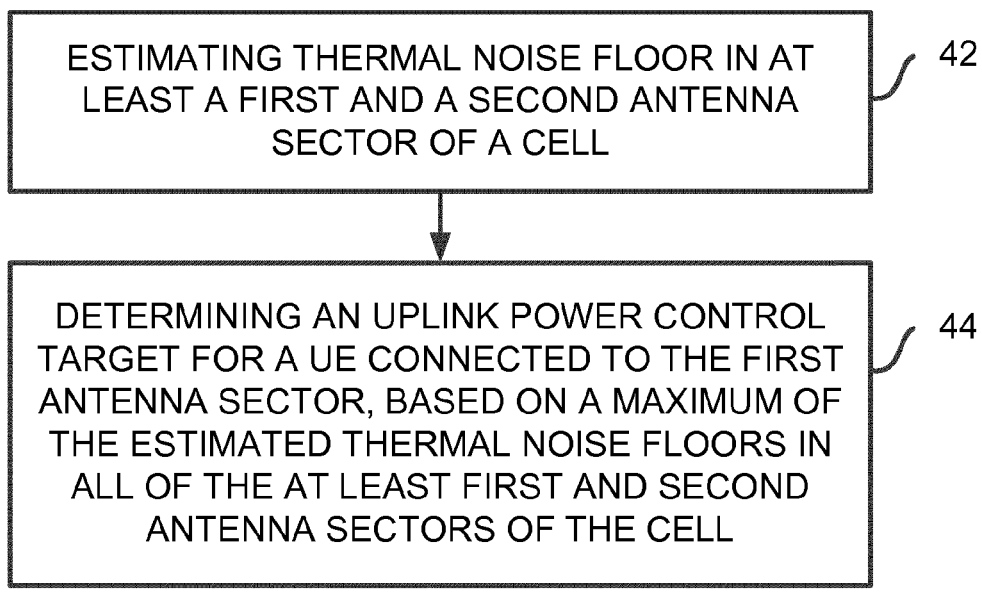
FIGS. 4 and 5 present actions in a method being performed in a base station, according to some embodiments.

With reference to the flow chart of FIG. 4, a method performed in a base station of a cell having at least a first and a second antenna sector, is now described. The base station is distributed in terms of location. The method comprises:

Action 42: Estimating thermal noise floor in the at least the first and the second antenna sectors.

Action 44: Determining an uplink power control target, for a user equipment connected to the first antenna sector, based on a maximum of the estimated thermal noise floors in all of the at least the first and the second antenna sectors.

In action 44, determining the uplink power control target may further be based on a first pre-determined power component for providing that an uplink signal from the UE is detectable by an antenna sector, having said maximum of the estimated thermal noise floors, of the at least the first and second antenna sectors.

The first pre-determined power component may be the so called power combining gain threshold (Δ) as introduced above.

In action 44, determining the uplink power control target may further be based on a second pre-determined power component for providing that an uplink signal from the UE has a target signal to noise ratio in each antenna sector.

The second pre-determined power component may be the signal-to-noise ratio, offset_cell, as described above and present in for instance equations (3)-(6).

In action 44, determining the uplink power control target may further be based on a third pre-determined power component providing a minimal detectable signal power in an antenna sector having the maximum thermal noise floor of the estimated thermal noise floors, of the at least the first and second antenna sectors.

The third pre-determined power component may be the SNR_min, being a minimal signal-to-noise ratio, representing that a signal may be detected even at lower signal power levels than the thermal noise floor of the antenna sector(s) wherein detection is performed, due to joint reception at several antenna sectors or cells.

In action 44, determining the uplink power control target may further be determined as the maximum of:

the sum of the thermal noise floor of the first antenna sector and the second pre-determined power component, and the sum of the maximum of the thermal noise floors, the first pre-determined power component, and the third pre-determined power component.

The method performed in the base station may further comprise obtaining a further thermal noise floor estimated in a further antenna sector of a second base station over an interface between the base station, being distributed in terms of location, and the second base station, wherein at least the first, the second and said further antenna sectors form a cell.

The method performed in a base station may also comprise communicating an information element (IE) from at least the first and the second antenna sectors, to a central control of the base station, being distributed in terms of location, wherein each IE comprises an identifier of the respective antenna sector, and a data item of the estimated thermal noise floor of the respective antenna sector.

The method performed in a base station may further comprise setting, internal to the base station, the determined uplink power control target, as an uplink power control target per antenna sector of the base station being distributed in terms of location, and using integrating means to enforce a signal power received from the UE to reach said determined uplink power control target.

The method performed in a base station may further comprise determining an uplink power control target specific to the UE, based on the determined uplink power control target and the estimated thermal noise floor of the first antenna sector, and signaling, to the UE, the uplink power control target that is specific to the UE.

The present disclosure also comprises a computer program, comprising computer readable code which when run on at least one processing circuit, causes the at least one processing circuit to carry out the method as above, for determining an uplink power control target for a UE.

The present disclosure also comprises a computer program product comprising computer-readable storage medium having stored thereon a computer program, as above.

Figure 5:
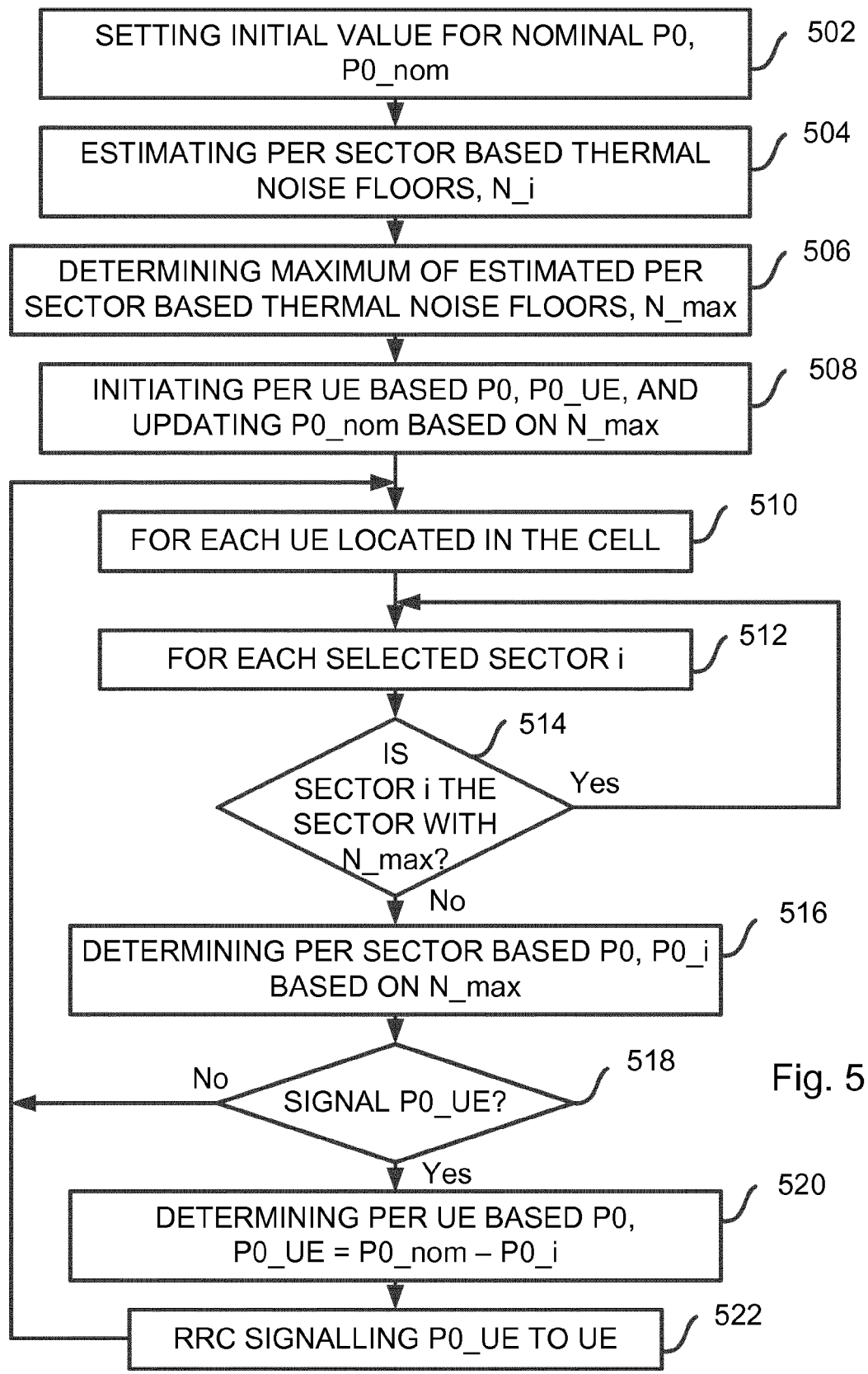

With reference to the flow chart of FIG. 5, a method performed in a base station of a cell having at least a first and a second antenna sector, for determining an uplink power control target for a user equipment connected to the first antenna sector, is now described. The base station is distributed in terms of location. The method comprises:

Action 502: Setting an initial value for a nominal uplink power control target, P0_nom.

Action 504: Estimating of per sector based thermal noise floors, N_i.

Action 506: Determining a maximum of the estimated per sector based thermal noise floors, N_max.

Action 508: Initiating per UE-based P0, P0_UE, and updating P0_nom based on the maximum of the estimated per sector based thermal noise floors, N_max.

Action 510: For each UE located in the cell, perform the following.

Action 512: For each selected antenna sector i, perform the following.

Action 514: Determining if the antenna sector i is the antenna sector that has the highest thermal noise floor N_max. If the answer is "Yes", action 512 is repeated.

Action 516: Determining per sector-based P0, P0_i based on N_max, is performed if the answer was "No" in action 514.

Action 518: Determining whether a UE specific P0 shall be signaled. If the UE specific P0 shall not be signaled, the following action is action 610. If the UE specific P0 shall be signaled, the following action is, setting the UE-specific P0 equal to the P0_nom−P0_i, in action 520.

Having determined the UE-specific P0, the following action is action 522 of RRC signaling the P0_UE to the UE.

The present disclosure also comprises a computer program, comprising instructions which, when executed on at least one processing circuit, cause the at least one processing circuit to carry out the method as above, for determining an uplink power control target for a UE.

The present disclosure also comprises a computer program product comprising computer-readable storage medium, having stored thereon a computer program, comprising instructions which, when executed on at least one processing circuit, cause the at least one processing circuit to carry out the method as above, for determining an uplink power control target for a UE.

The present disclosure also comprises a base station 60, 70 of a cell having at least a first and a second antenna sector, where the base station is configured to be distributed in terms of location. The base station is configured to estimate, in the at least the first and the second antenna sectors, a thermal noise floor. The base station is also configured to determine an uplink power control target, for a UE connected to the first antenna sector, based on a maximum of the estimated thermal noise floors in all of the at least the first and the second antenna sectors.

The base station 60, 70 may further be configured to determine the uplink power control target based on a first pre-determined power component for providing that an uplink signal from the UE is detectable by an antenna sector, having said maximum of the estimated thermal noise floors, of the at least the first and second antenna sectors.

The base station 60, 70 may further be configured to determine the uplink power control target based on a second pre-determined power component for providing that an uplink signal from the UE has a target signal to noise ratio in each antenna sector.

The base station 60, 70 may further be configured to determine the uplink power control target based on a third pre-determined power component providing a minimal detectable signal power in the antenna sector having the maximum thermal noise floor of the estimated thermal noise floors, of the at least the first and second antenna sectors.

It is also optional for the base station 60, 70 to be configured to determine the uplink power control target as the maximum of:
  the sum of the thermal noise floor of the first antenna sector and the second pre-determined power component, and
  the sum of the maximum of the thermal noise floors, the first pre-determined power component, and the third pre-determined power component.

The first pre-determined power component may be the so called power combining threshold (Δ) as described above.

The second pre-determined power component may be the signal-to-noise ratio, offset_cell, as described above and present in for instance equations (3)-(6).

The third pre-determined power component may be the SNR_min, being a minimal signal-to-noise ratio, representing that a signal may be detected even at lower signal power levels than the thermal noise floor of the antenna sector(s) wherein detection is performed, due to joint reception at several antenna sectors or cells.

The base station 60, 70 may also be configured to obtain a further thermal noise floor estimated in a further antenna sector of a second base station over an interface between said base station that is distributed in terms of location, and the second base station, wherein at least the first, the second and said further antenna sectors form a cell.

Radio units of antenna sectors may hence be served by more than one base station.

The base station 60, 70 may further be configured to communicate an information element (IE) from at least the first and the second antenna sectors, to a central control of said base station that is distributed in terms of location, wherein each IE comprises an identifier of the respective antenna sector, and a data item of the estimated thermal noise floor of the respective antenna sector.

Thus, the base station may also be capable of signaling thermal noise floor information to a power control function of a cell and basing the determination of uplink power control target (P0) on the signaled thermal noise floor information.

The base station 60, 70 may further be configured to set, internal to the base station, the determined uplink power control target, as an uplink power control target per antenna sector of the base station being distributed in terms of location, and to use integrating means to enforce a signal power received from the UE to reach said determined uplink power control target.

In addition, the base station 60, 70 may also be configured to determine an uplink power control target specific to the UE, based on the determined uplink power control target and the estimated thermal noise floor of the first antenna sector, and to signal, to the UE, the uplink power control target that is specific to the UE.

Figure 6:
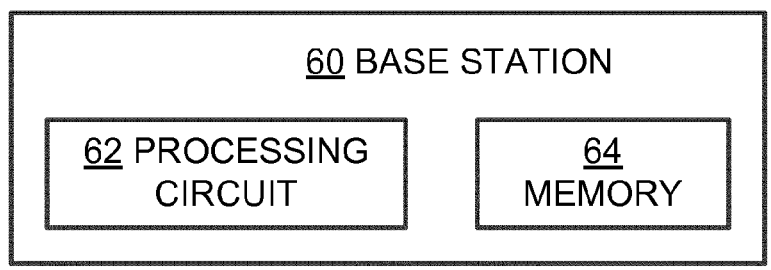
FIGS. 6 and 7 schematically present a base station according to different embodiments.

With reference to FIG. 6, an alternative embodiment of the base station is presented. The base station 60 is capable of being configured to be distributed in terms of location. The base station comprises a processing circuit 62, and a memory 64, said memory containing instructions executable by said processing circuit 62 whereby said base station 60 is operative to estimate, in the at least the first and the second antenna sectors, a thermal noise floor. The base station is also operative to determine an uplink power control target, for a user equipment (UE) connected to the first antenna sector, based on a maximum of the estimated thermal noise floors in all of the at least the first and the second antenna sectors.

Figure 7:
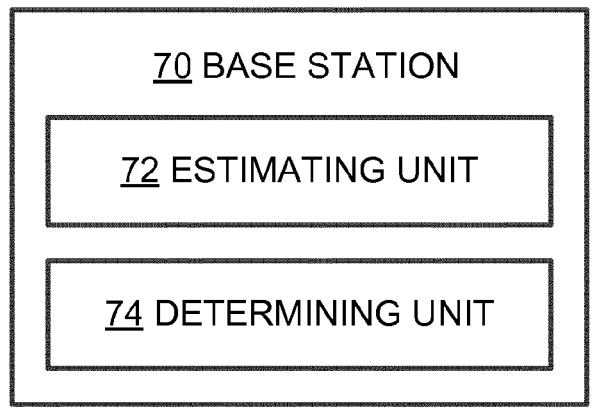

In an alternative way to describe the base station, FIG. 7 presents a base station 70 is capable of being configured to be distributed in terms of location. The base station 70 comprises an estimating unit 72, and a determining unit 74. The estimating unit 72 is configured to estimate, in the at least the first and the second antenna sectors, a thermal noise floor. The determining unit 74 is configured to determine an uplink power control target, for a user equipment (UE) connected to the first antenna sector, based on a maximum of the estimated thermal noise floors in all of the at least the first and the second antenna sectors.

Embodiments of the present exemplary embodiments have the following advantages:

Improved uplink performance of cells with antenna sectors having different receiver sensitivity is provided.

Consequently, the difficulties to configure P0 for cells with antenna sectors having different receiver sensitivity, are hereby eliminated.

Also, an enhanced observability of UEs for cells extending over multiple base stations is provided.

It may be further noted that the above described embodiments are only given as examples and should not be limiting to the present exemplary embodiments, since other solutions, uses, objectives, and functions are apparent within the scope of the embodiments as claimed in the accompanying patent claims.

The invention claimed is:

1. A method in a base station of a cell having at least a first antenna sector and a second antenna sector, the base station being distributed in terms of location, the method comprising:
   estimating, in each of the at least the first and second antenna sectors, a thermal noise floor;
   determining the highest thermal noise floor value of the estimated thermal noise floors in all of the at least the first and second antenna sectors; and
   determining an uplink power control target for a user equipment (UE) connected to the first antenna sector based on the determined highest thermal noise floor of the estimated thermal noise floors in all of the at least the first and second antenna sectors.

2. The method of claim 1, wherein the determining the uplink power control target is further based on a first predetermined power component for providing that an uplink signal from the UE is detectable by an antenna sector having the determined highest thermal noise floor of the estimated thermal noise floors of the at least the first and second antenna sectors.

3. The method of claim 2, wherein the determining the uplink power control target is further based on a second predetermined power component for providing that an uplink signal from the UE has a target signal to noise ratio in each antenna sector.

4. The method of claim 3, wherein the determining the uplink power control target is further based on a third predetermined power component for providing a minimal detectable signal power in an antenna sector having the determined highest thermal noise floor of the estimated thermal noise floors of the at least the first and second antenna sectors.

5. The method of claim 4, wherein the determining the uplink power control target is further determined as the maximum of:
   a sum of the thermal noise floor of the first antenna sector and the second predetermined power component; and
   a sum of the determined highest thermal noise floor of the estimated thermal noise floors, the first predetermined power component, and the third predetermined power component.

6. The method of claim 1:
   further comprising obtaining a further thermal noise floor estimated in a further antenna sector of a second base station over an interface between the base station and the second base station;
   wherein at least the first, second, and further antenna sectors form a cell.

7. The method of claim 1:
   further comprising communicating an information element (IE) from the at least the first and second antenna sectors to a central control of the base station;
   wherein each IE comprises an identifier of the respective antenna sector, and a data item of the estimated thermal noise floor of the respective antenna sector.

8. The method of claim 1:
   further comprising setting, internal to the base station, the determined uplink power control target as an uplink power control target per antenna sector of the base station; and
   using integrating means to enforce a signal power received from the UE to reach the determined uplink power control target.

9. The method of claim 1:
   further comprising determining an uplink power control target specific to the UE based on the determined uplink power control target and the estimated thermal noise floor of the first antenna sector; and
   signaling, to the UE, the uplink power control target that is specific to the UE.

10. A base station of a cell having at least a first antenna sector and a second antenna sector, the base station being distributed in terms of location, the base station comprising:
    processing circuitry; and
    memory containing instructions executable by the processing circuitry whereby the base station is operative to:
      estimate, in each of the at least the first and second antenna sectors, a thermal noise floor;
      determine the highest thermal noise floor value of the estimated thermal noise floors in all of the at least the first and second antenna sectors; and
      determine an uplink power control target for a user equipment (UE) connected to the first antenna sector based on the determined highest thermal noise floor of the estimated thermal noise floors in all of the at least the first and second antenna sectors.

11. The base station of claim 10, wherein the instructions are such that the base station is operative to determine the uplink power control target based on a first predetermined power component for providing that an uplink signal from the UE is detectable by an antenna sector having the determined highest thermal noise floor of the estimated thermal noise floors of the at least the first and second antenna sectors.

12. The base station of claim 11, wherein the instructions are such that the base station is operative to determine the uplink power control target based on a second predetermined power component for providing that an uplink signal from the UE has a target signal to noise ratio in each antenna sector.

13. The base station of claim 12, wherein the instructions are such that the base station is operative to determine the uplink power control target based on a third predetermined power component for providing a minimal detectable signal power in the antenna sector having the determined highest thermal noise floor of the estimated thermal noise floors of the at least the first and second antenna sectors.

14. The base station of claim 13, wherein the instructions are such that the base station is operative to determine the uplink power control target as the maximum of:
    a sum of the thermal noise floor of the first antenna sector and the second predetermined power component; and
    a sum of the determined highest thermal noise floor of the estimated thermal noise floors, the first predetermined power component, and the third predetermined power component.

15. The base station of claim 10:
    wherein the instructions are such that the base station is operative to obtain a further thermal noise floor estimated in a further antenna sector of a second base station over an interface between the base station and the second base station;
    wherein at least the first, second and further antenna sectors form a cell.

16. The base station of claim 10:
wherein the instructions are such that the base station is operative to communicate an information element (IE) from the at least the first and second antenna sectors to a central control of the base station;
wherein each IE comprises an identifier of the respective antenna sector, and a data item of the estimated thermal noise floor of the respective antenna sector.

17. The base station of claim 10, wherein the instructions are such that the base station is operative to:
set, internal to the base station, the determined uplink power control target as an uplink power control target per antenna sector of the base station; and
use integrating means to enforce a signal power received from the UE to reach the determined uplink power control target.

18. The base station of claim 10, wherein the instructions are such that the base station is operative to:
determine an uplink power control target specific to the UE based on the determined uplink power control target and the estimated thermal noise floor of the first antenna sector; and
signal, to the UE, the uplink power control target that is specific to the UE.

19. A non-transitory computer readable recording medium storing a computer program product for controlling a base station of a cell having at least a first antenna sector and a second antenna sector, the base station being distributed in terms of location, the computer program product comprising software instructions which, when run on processing circuitry of the base station, cause the base station to:
estimate, in each of the at least the first and second antenna sectors, a thermal noise floor;
determine the highest thermal noise floor value of the estimated thermal noise floors in all of the at least the first and second antenna sectors; and
determine an uplink power control target for a user equipment (UE) connected to the first antenna sector based on the determined highest thermal noise floor of the estimated thermal noise floors in all of the at least the first and second antenna sectors.

* * * * *